US012025255B2

(12) United States Patent
Surve

(10) Patent No.: US 12,025,255 B2
(45) Date of Patent: Jul. 2, 2024

(54) QUICK ACTION FLUID COUPLER

(71) Applicant: EATON INTELLIGENT POWER LIMITED, Dublin (IE)

(72) Inventor: Vijay Vitthal Surve, Maharashtra (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 94 days.

(21) Appl. No.: 17/725,112

(22) Filed: Apr. 20, 2022

(65) Prior Publication Data

US 2022/0341525 A1  Oct. 27, 2022

(30) Foreign Application Priority Data

Apr. 23, 2021  (IN)  .............................. 202111018761

(51) Int. Cl.
 *F16L 37/10*  (2006.01)
(52) U.S. Cl.
 CPC .................................. *F16L 37/101* (2013.01)
(58) Field of Classification Search
 CPC ... F16L 37/101; F16L 37/107; F16L 37/0887; F16L 37/0885; F16L 37/113; F16L 37/248
 See application file for complete search history.

(56) References Cited

U.S. PATENT DOCUMENTS

| | | | |
|---|---|---|---|
| 5,056,560 A * | 10/1991 | DeMartelaere | F16L 37/101 |
| 5,226,682 A | 7/1993 | Marrison et al. | |
| 5,348,354 A | 9/1994 | Badoureaux | |
| 5,553,895 A | 9/1996 | Karl et al. | |
| 5,553,901 A | 9/1996 | Serot | |
| 6,065,779 A | 5/2000 | Moner et al. | |
| 6,494,494 B2 | 12/2002 | Vogel et al. | |
| 6,557,824 B1 | 5/2003 | Jenski, Jr. et al. | |
| 6,581,981 B2 | 6/2003 | Cooper | |
| 6,592,151 B2 | 7/2003 | Densel et al. | |
| 7,063,359 B2 | 6/2006 | Vallee | |
| 7,156,424 B2 | 1/2007 | McCord | |
| 7,455,280 B2 | 11/2008 | Parrish | |

(Continued)

FOREIGN PATENT DOCUMENTS

| | | |
|---|---|---|
| AT | 524862 B1 * | 10/2022 |
| CA | 2 859 196 C | 11/2018 |

(Continued)

OTHER PUBLICATIONS

English translation of Preliminary Search Report and Written Opinion of French Application No. 2203743 dated Nov. 6, 2023.

*Primary Examiner* — Zachary T Dragicevich
(74) *Attorney, Agent, or Firm* — Merchant & Gould P.C.

(57) ABSTRACT

A fluid coupler includes a socket including a socket body defining a receptacle for receiving a plug. A snap ring is mounted within the receptacle for retaining the plug within the receptacle. The snap ring is moveable between a constricted state in which the snap ring is adapted to retain the plug within the receptacle and an expanded state in which the plug is removeable from the receptacle. A release sleeve is mounted over the socket body. The release sleeve is moveable between a non-actuated position and an actuated position. The release sleeve is configured to move the snap ring from the constricted state to the expanded state when moved from the non-actuated position to the actuated position.

25 Claims, 12 Drawing Sheets

(56) References Cited

U.S. PATENT DOCUMENTS

| | | |
|---|---|---|
| 7,488,006 B2 | 2/2009 | Dahms et al. |
| 7,658,420 B2 | 2/2010 | Harger et al. |
| 7,832,774 B2 | 11/2010 | Densel et al. |
| 7,850,208 B2 | 12/2010 | Greenberger |
| 8,454,059 B2 | 6/2013 | Stell |
| 8,479,775 B2 | 7/2013 | Swails et al. |
| 8,485,228 B2 | 7/2013 | Binder et al. |
| 8,491,012 B2 | 7/2013 | Le Quere |
| 8,672,365 B2 | 3/2014 | Le Quere |
| 8,672,897 B2 | 3/2014 | Elahi et al. |
| 8,746,750 B2 | 6/2014 | Gilbreath |
| 9,068,680 B1 | 7/2015 | Crompton et al. |
| 9,388,923 B2 | 7/2016 | Romano |
| 9,511,636 B2 | 12/2016 | Kuo |
| 9,528,650 B2 | 12/2016 | Tiberghien et al. |
| 9,732,892 B2 | 8/2017 | Gilbreath |
| 9,746,114 B2 | 8/2017 | Le Quere |
| 9,879,810 B2 | 1/2018 | Crompton et al. |
| 10,006,576 B2 | 6/2018 | Brimble et al. |
| 10,060,563 B2 | 8/2018 | Campbell et al. |
| 10,094,500 B2 | 10/2018 | Crompton et al. |
| 10,374,333 B2 | 8/2019 | Le Quere |
| 10,415,733 B2 | 9/2019 | Hamon et al. |
| 10,584,820 B2 | 3/2020 | Williams et al. |
| 10,690,278 B2 | 6/2020 | Deore et al. |
| 11,698,156 B2 * | 7/2023 | Kuhn ................ F16L 37/0885 |
| 2003/0006609 A1 | 1/2003 | Yates |
| 2009/0008927 A1 * | 1/2009 | Binder ............... F16L 37/0885 |
| 2015/0276110 A1 * | 10/2015 | Parekh ................ F16L 37/113 |
| 2016/0138744 A1 | 5/2016 | Polgati et al. |
| 2017/0227153 A1 * | 8/2017 | Nezu ................. F16L 37/0885 |
| 2017/0321836 A1 | 11/2017 | Danelli et al. |
| 2018/0266605 A1 | 9/2018 | Hill |
| 2019/0219209 A1 | 7/2019 | Zeiber |
| 2020/0309298 A1 | 10/2020 | Kuhn et al. |

FOREIGN PATENT DOCUMENTS

| | | |
|---|---|---|
| CN | 208886211 U | 5/2019 |
| CN | 209026330 U | 6/2019 |
| DE | 31 24 027 A1 | 1/1983 |
| DE | 20 2011 004 777 U1 | 7/2011 |
| DE | 10 2016 223 355 A1 | 8/2017 |
| EP | 0 211 778 A1 | 2/1987 |
| EP | 0 378 035 A1 | 7/1990 |
| EP | 0 200 666 B1 | 9/1992 |
| EP | 0 381 603 B1 | 1/1993 |
| EP | 0 724 109 B1 | 3/2000 |
| EP | 0 820 256 B1 | 7/2002 |
| EP | 2 476 940 A2 | 7/2012 |
| EP | 2 322 831 B1 | 5/2013 |
| EP | 2 452 112 B1 | 11/2013 |
| EP | 2 476 940 A3 | 11/2013 |
| EP | 2 452 113 B1 | 3/2014 |
| EP | 2 565 509 B1 | 11/2014 |
| EP | 2 896 865 B1 | 11/2016 |
| EP | 3 569 898 A1 | 11/2019 |
| EP | 3 569 908 A1 | 11/2019 |
| EP | 3 473 912 B1 | 12/2020 |
| FR | 3 076 882 A1 | 7/2019 |
| FR | 3 057 049 B1 | 8/2019 |
| GB | 895 056 A | 4/1962 |
| JP | 4866968 B1 | 2/2012 |
| JP | 2018-031417 A | 3/2018 |
| JP | 2020-051580 A | 4/2020 |
| WO | 84/04138 A1 | 10/1984 |
| WO | 00/14444 A1 | 3/2000 |
| WO | 2013/056273 A4 | 4/2013 |
| WO | 2015/033128 A1 | 3/2015 |
| WO | 2019/210933 A1 | 11/2019 |
| WO | 2019/211478 A1 | 11/2019 |
| WO | 2021/009454 A1 | 1/2021 |

* cited by examiner

QUICK ACTION FLUID COUPLER

CROSS-REFERENCE TO RELATED APPLICATION

This application claims the benefit of Indian Provisional Patent Application No. 202111018761, filed on Apr. 23, 2021, the disclosure of which is incorporated herein by reference in its entirety.

BACKGROUND

Fluid couplers are used to fluidly connect a fluid conveying component (e.g., a tube/hose) to another fluid conveying component (e.g., another tube/hose, a fluid manifold, a motor, a pump, a cooling system, etc.). A typical fluid coupler includes a mating socket and a plug. For quick action couplers, it is desirable for the mating socket and the plug to be securely and reliably coupled together by a single linear motion without requiring additional actions such as applying torque to a threaded coupling element. For quick action couplers, it is also desirable to avoid coupler arrangements that require a separate tool to connect and/or disconnect the coupling arrangements.

SUMMARY

One aspect of the present disclosure relates to a fluid coupler including a socket including a socket body defining a receptacle for receiving a plug. A snap ring is mounted within the receptacle for retaining the plug within the receptacle. The snap ring is moveable between a constricted state in which the snap ring is adapted to retain the plug within the receptacle and an expanded state in which the plug is removeable from the receptacle. A release sleeve is mounted over the socket body. The release sleeve is moveable between a non-actuated position and an actuated position. The release sleeve being configured to move the snap ring from the constricted state to the expanded state when moved from the non-actuated position to the actuated position.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Aspects of the present disclosure relate to a quick acting fluid coupler. In certain examples, the fluid coupler provides fluid tight sealing and is not required to be torqued (i.e., threaded connections are not used). In one example, linear sliding motion is used to provide connection and/or disconnection of the coupler. In one example, the coupler is operable at fluid pressures equal to or greater than 120 pounds per square inch. In one example, the coupler is operable across fluid temperatures ranging from −65 to 275 degrees Fahrenheit. In certain examples, the coupler has a relatively light weight construction. In certain examples, the coupler is adapted for use with fluids such Ethylene glycol, propylene glycol, PAO, Jet Fuel A, lube oil, etc. In certain, examples the coupler is adapted for use with coolants. In certain examples, the coupler has electrical conductivity less than 0.5 ohm. In certain examples, the coupler is adapted for use in coolant conveyance in an aircraft. In one example, the coupler can be used for coolant conveyance for motor and inverter cooling in an aircraft such as an electric vertical takeoff and landing (eVTOL) aircraft.

Figure 1:
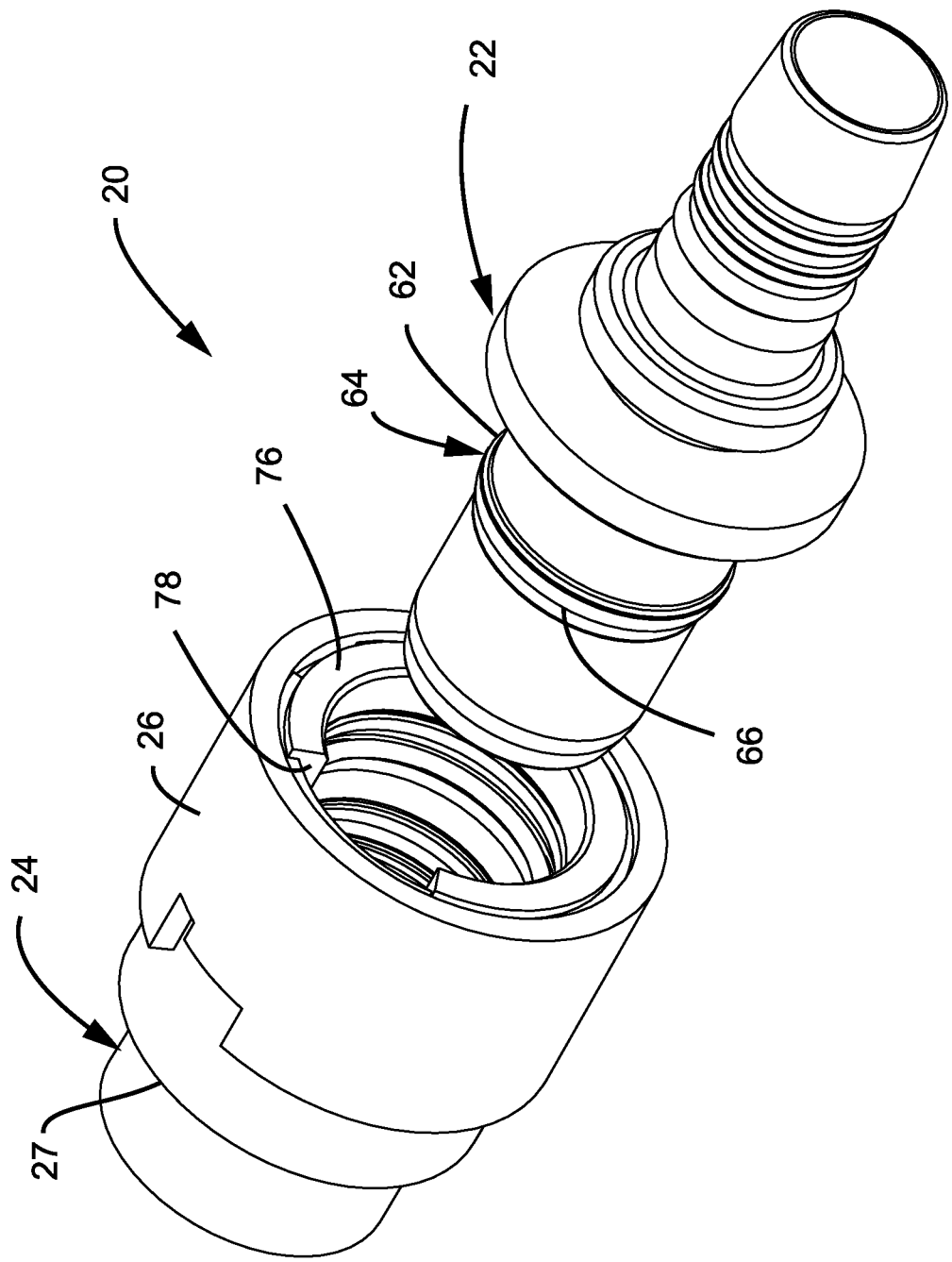
FIG. 1 depicts a fluid coupler in accordance with the principles of the present disclosure in an unmated state, the fluid coupler including a plug and a socket.
Figure 2:
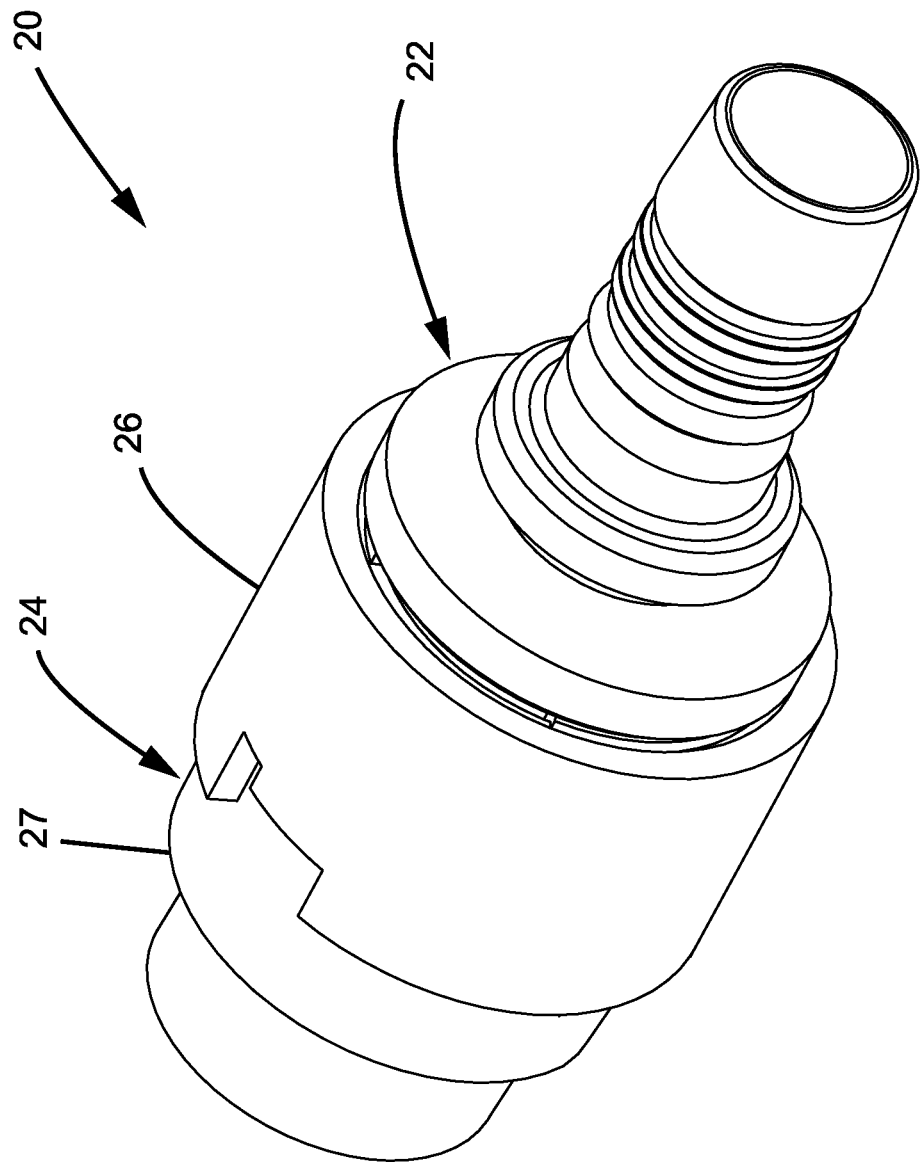
FIG. 2 depicts the fluid coupler of FIG. 1 in a mated state.
Figure 8:
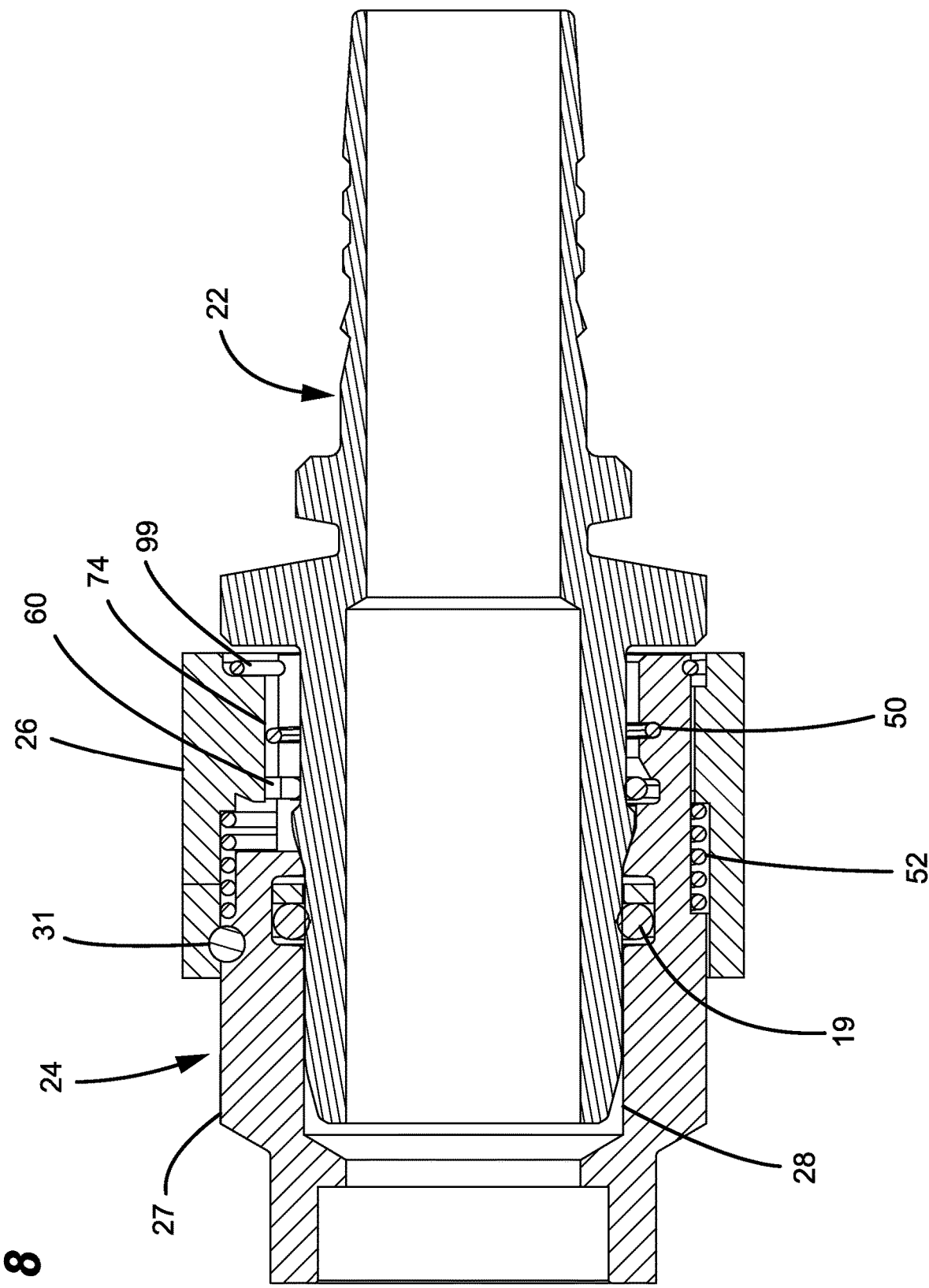
FIG. 8 is a cross-sectional view showing the plug and socket of FIG. 1 secured together.

FIGS. 1 and 2 depict a quick acting fluid coupler 20 in accordance with the principles of the present disclosure. The coupler 20 includes a mating plug 22 and a socket 24. FIG. 1 depicts the plug 22 and socket 24 unmated, but staged for coupling by providing co-axial alignment between the plug 22 and the socket 24. FIG. 2 shows the plug 22 and the socket 24 coupled together. In certain examples, no active structures are provided on the plug 22 for releasing the plug 22 from the socket 24 or for securing the plug 22 in the socket 24. In certain examples, a separate tool (that would be susceptible to being lost) is not required to release the plug 22 from the socket 24. In one example, the plug 22 is coupled to the socket 24 by inserting the plug linearly into the socket 24 regardless of rotational positioning between the plug 22 and the socket 24. Thus, it is not necessary to provide rotational keying between the plug 22 and the socket 24. In one example, a release sleeve 26 is provided that when actuated allows the plug 22 to be linearly withdrawn from the socket 24. The plug 22 can be adapted for connection to a fluid conduit such as a hose by a structure such as a fitting (e.g., see barbed fitting 25 in FIG. 3). In one example, an annular seal 19 is provided within a plug receptacle of the socket receptacle (see FIG. 3) about the socket axis for sealing against an exterior surface of the plug 22 when the plug 22 is secured within the socket receptacle (e.g., see FIG. 8). In one example, the seal 19 is a radial seal that provides radial sealing between an exterior of the plug 22 and an interior of the socket 24.

Figure 5:
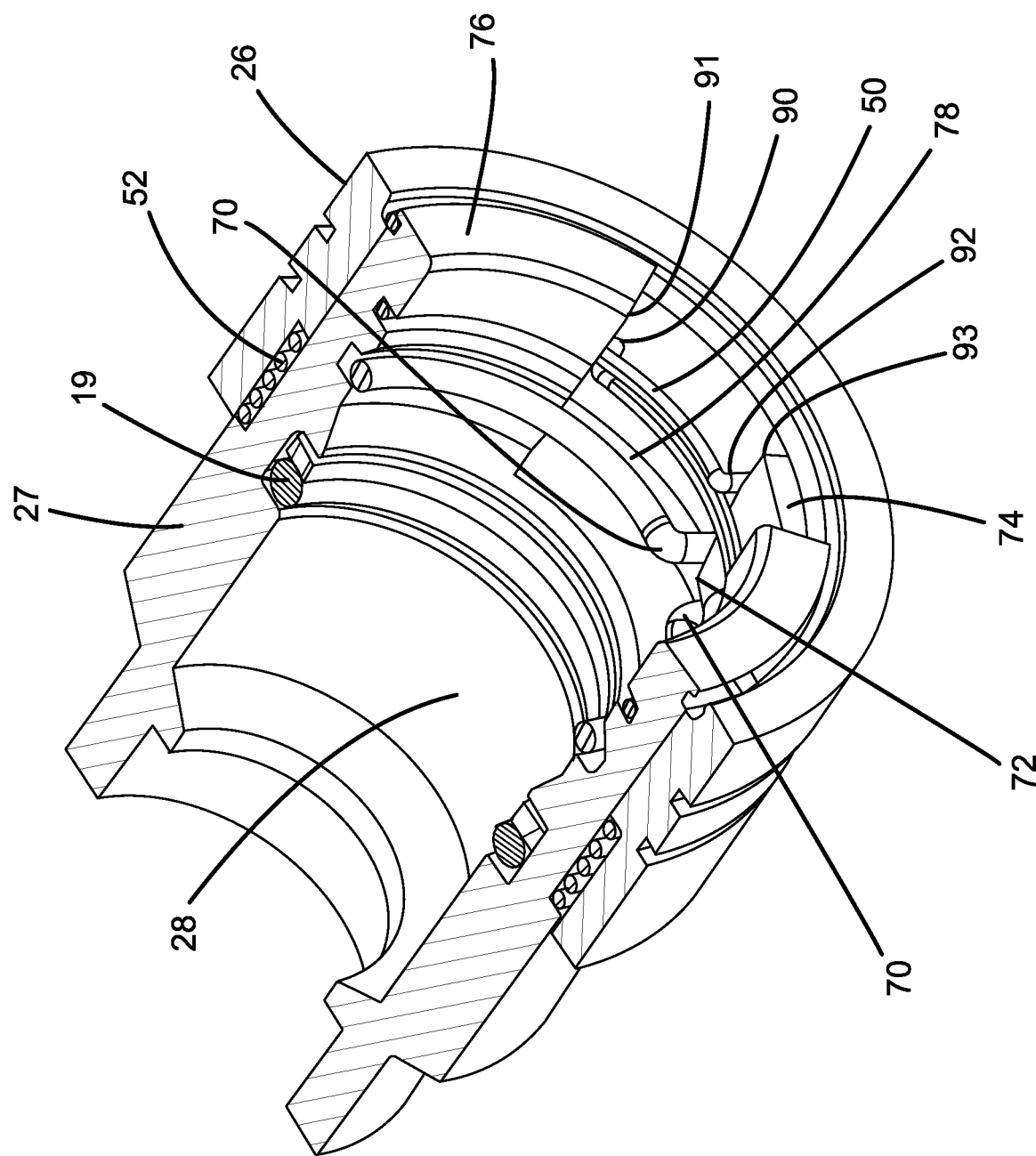
FIG. 5 is a cross-sectional view of the socket of the fluid coupler of FIG. 1.

In one example, the socket 24 includes a main socket body 27 defining a receptacle 28 for receiving the plug 22 (e.g., see FIG. 5). The release sleeve 26 is mounted on an exterior of the main socket body 27 and is moveable relative to the main socket body 27 between a non-actuated position and an actuated position. The non-actuated position can be referred to as a neutral or at-rest position and the actuated position can be referred to as a release position. In one example, the release sleeve 26 is configured to be rotated about a central axis of the main socket body 27 between a first rotational position (see FIGS. 9 and 10) and a second rotational position (see FIGS. 11 and 12). A stop 31 (e.g., a ball or pin) fixed relative to the main socket body 27 is captured between first and second rotational stop surfaces 33, 35 defined by the release sleeve 26 which correspond to the first and second rotational positions (e.g., see FIGS. 9-12).

Figure 11:
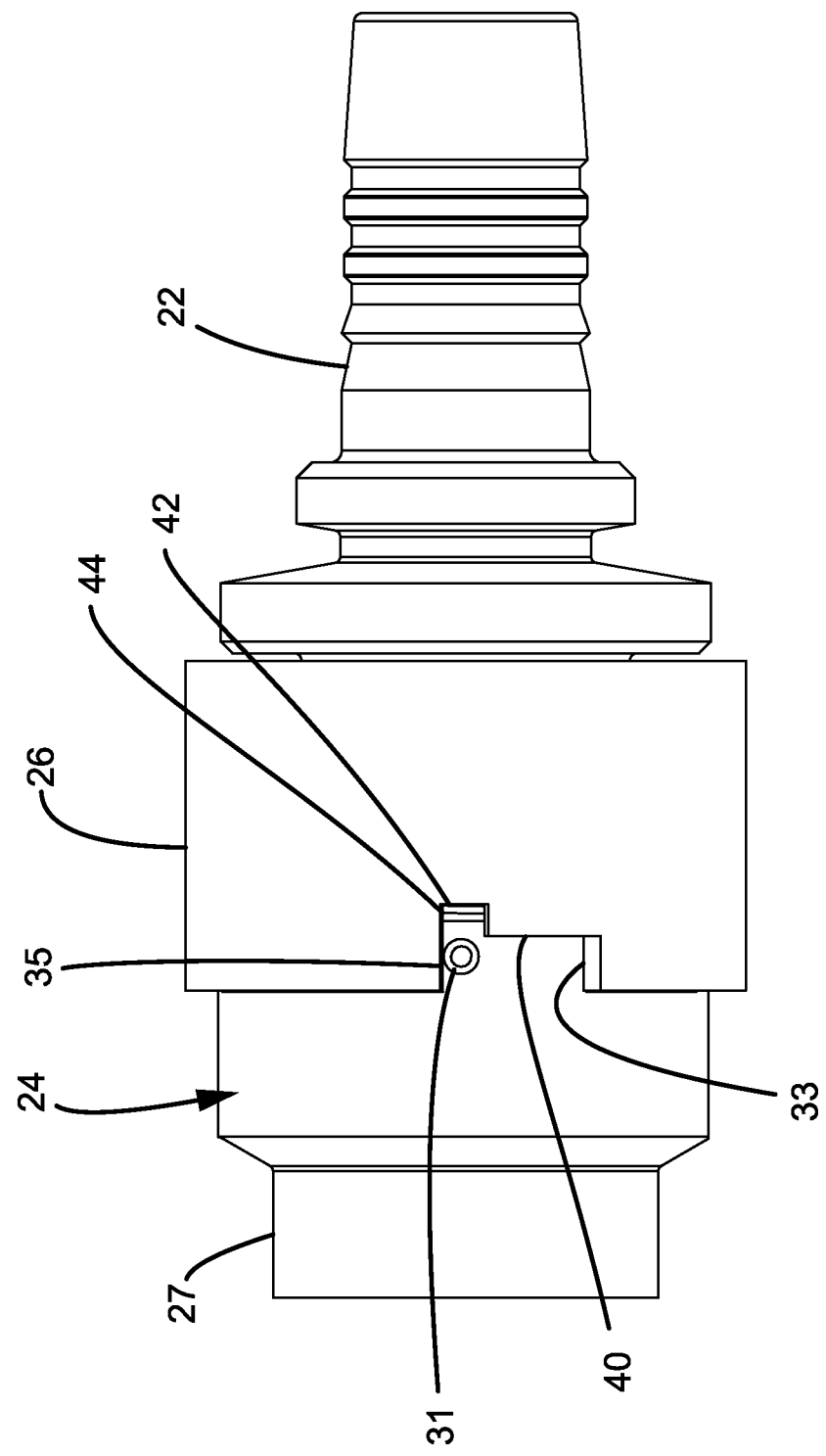
FIG. 11 shows the release sleeve of the socket rotated to a second rotational position but remaining in the first axial position.
Figure 12:
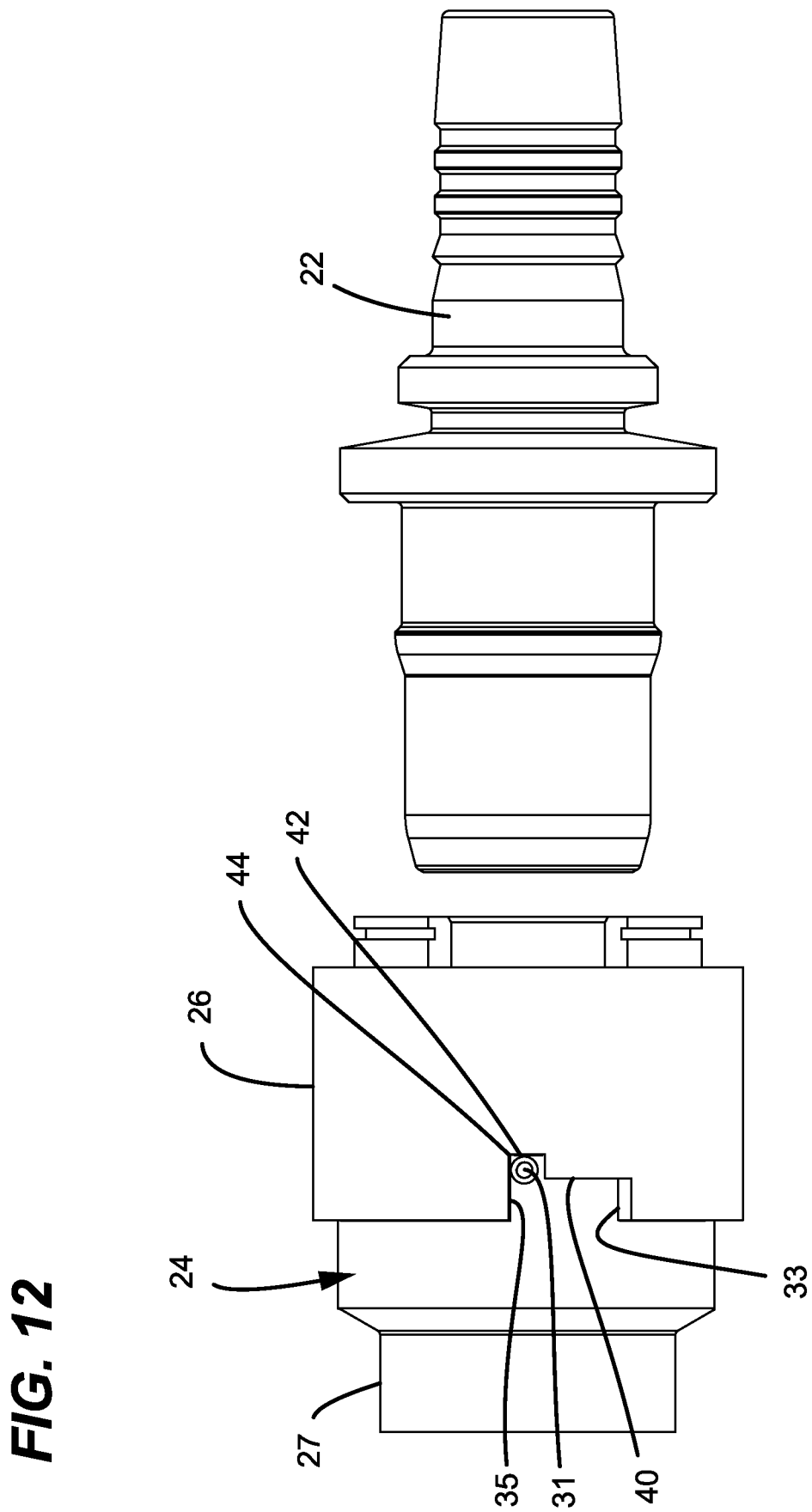
FIG. 12 shows the release sleeve in the actuated position in which the plug can be removed from the socket, the release sleeve is in the second rotational position and a second axial position when in the actuated position.

The release sleeve 26 also is configured to be slid axially along the central axis of the main socket body 27 between a first axial position (see FIGS. 9-11) and a second axial position (see FIG. 12). First and second axial stop surfaces 40, 42 defined by the release sleeve 26 are engaged by the stop 31 when the release sleeve 26 is respectively in the first and second axial positions (see FIGS. 9 and 12). The second axial stop surface 42 is provided at an end of an axial slot 44 defined by the release sleeve 26 at the second rotational position. The slot 44 is configured to receive the stop 31 as the release sleeve 26 is moved from the first axial position to the second axial position. In one example, a first spring 50 (e.g., a torsion spring) rotationally biases the release sleeve 26 toward the first rotational position and a second spring 52 axially biases the release sleeve 26 toward the first axial position (e.g., see FIGS. 5 and 8).

When the release sleeve 26 is in the non-actuated position, the release sleeve 26 is in the first rotational position and the first axial position with respect to the main socket body 27. When the release sleeve 26 is in the actuated position, the release sleeve 26 is in the second rotational position and the second axial position with respect to the main socket body 27. The first and second springs 50, 52 bias the release sleeve 26 toward the non-actuated position. The release sleeve 26 is moved to the actuated position by first rotating the release sleeve 26 from the first rotational position to the second rotational position, and then sliding the release sleeve 26 from the first axial position to the second axial position. Interference between the stop 31 and the first axial stop surface 40 prevents the release sleeve 26 from being moved from the first axial position to the second axial position across the range of rotational movement except at the second rotational position. Thus, the release sleeve 26 can only be moved from the first axial position to the second axial position when the release sleeve 26 is in the second rotational position.

Figure 3:
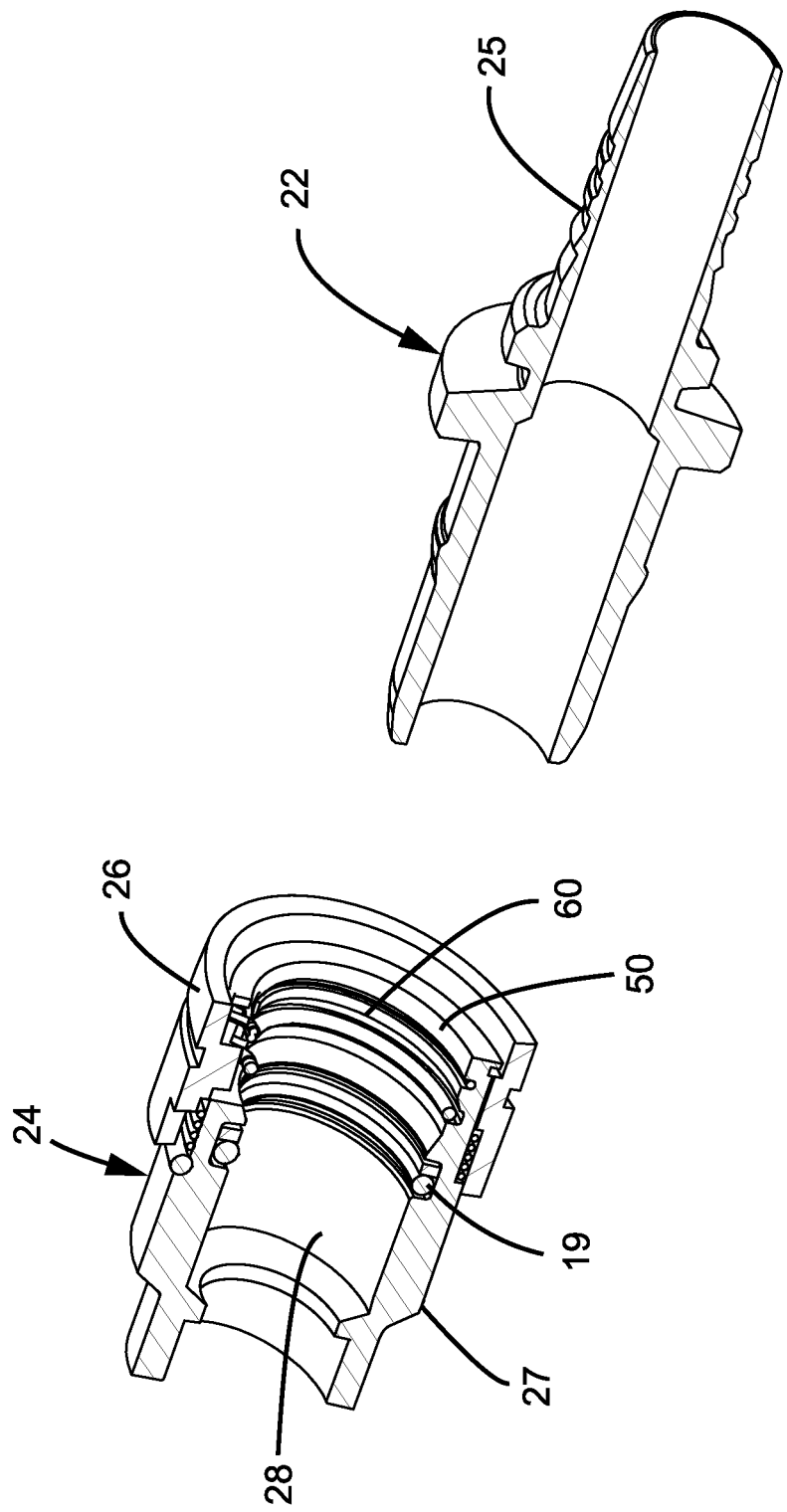
FIG. 3 is a cross-sectional view of the fluid coupler of FIG. 1.
Figure 9:
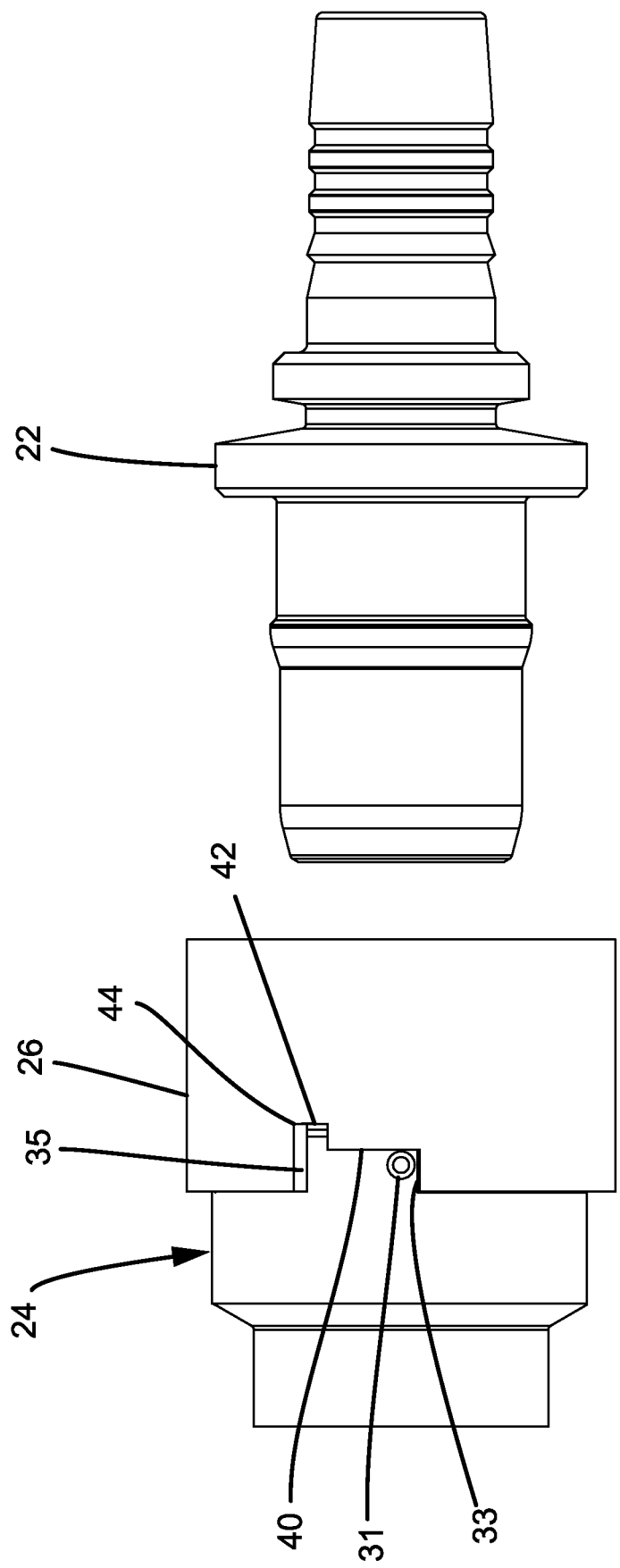
FIG. 9 shows the socket and plug of the fluid coupler of FIG. 1 staged for coupling, the release sleeve of the socket being shown in a non-actuated position in which the retention sleeve is in a first axial position and a first rotational position relative to the socket body.
Figure 10:
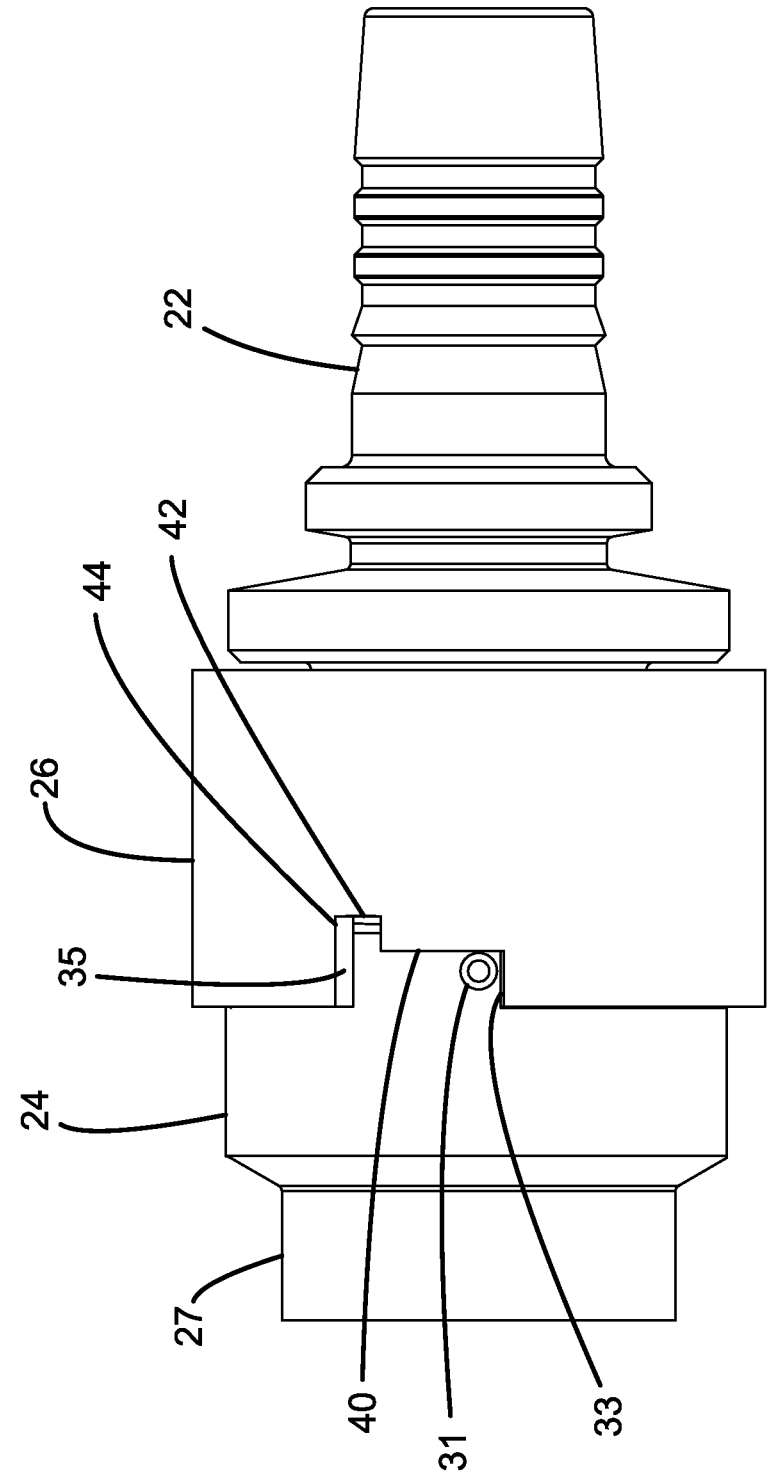
FIG. 10 shows the socket and plug of the fluid coupler of FIG. 1 coupled together, the release sleeve of the socket remains in the non-actuated position during and after coupling of the plug within the socket.

In one example, a snap ring 60 is provided within the receptacle 28 of the main socket body 27 for retaining the plug 22 within the socket 24 (see FIG. 3). The snap ring 60 is configured to be moved by the release sleeve 26 from a constricted state to an expanded state to enable the plug 22 to be linearly withdrawn from the socket 24. In one example, the snap ring 60 is adapted to oppose a stop surface 62 (FIG. 1) on an exterior of the plug 22 to retain the plug 22 within the socket receptacle 28 when in the constricted state (e.g., see FIG. 8). In one example, the stop surface 62 defined as part of an annular rib 64 at an exterior of the plug 22 that surrounds a central axis of the plug 22 (see FIG. 1). In one example, the annular rib 64 includes a ramped leading surface 66 for expanding the snap ring 60 as the plug is inserted into the socket 22, and the stop surface 62 of the rib 64 is provided at a trailing side of the rib 64. During plug insertion, once the rib 64 moves past the snap ring 60, the snap ring 60 resiliently returns to the constricted state and opposes the stop surface 62 of the rib 64 to prevent the plug 22 from being withdrawn from the socket 24. The snap ring 60 is configured to allow the plug 22 to be axially withdrawn from the socket receptacle 28 when moved to the expanded state by the release sleeve 26. The release sleeve 26 remains in the non-actuated state, as shown by FIGS. 9 and 10, as the plug 22 is inserted into and secured within the socket 24.

Figure 4:
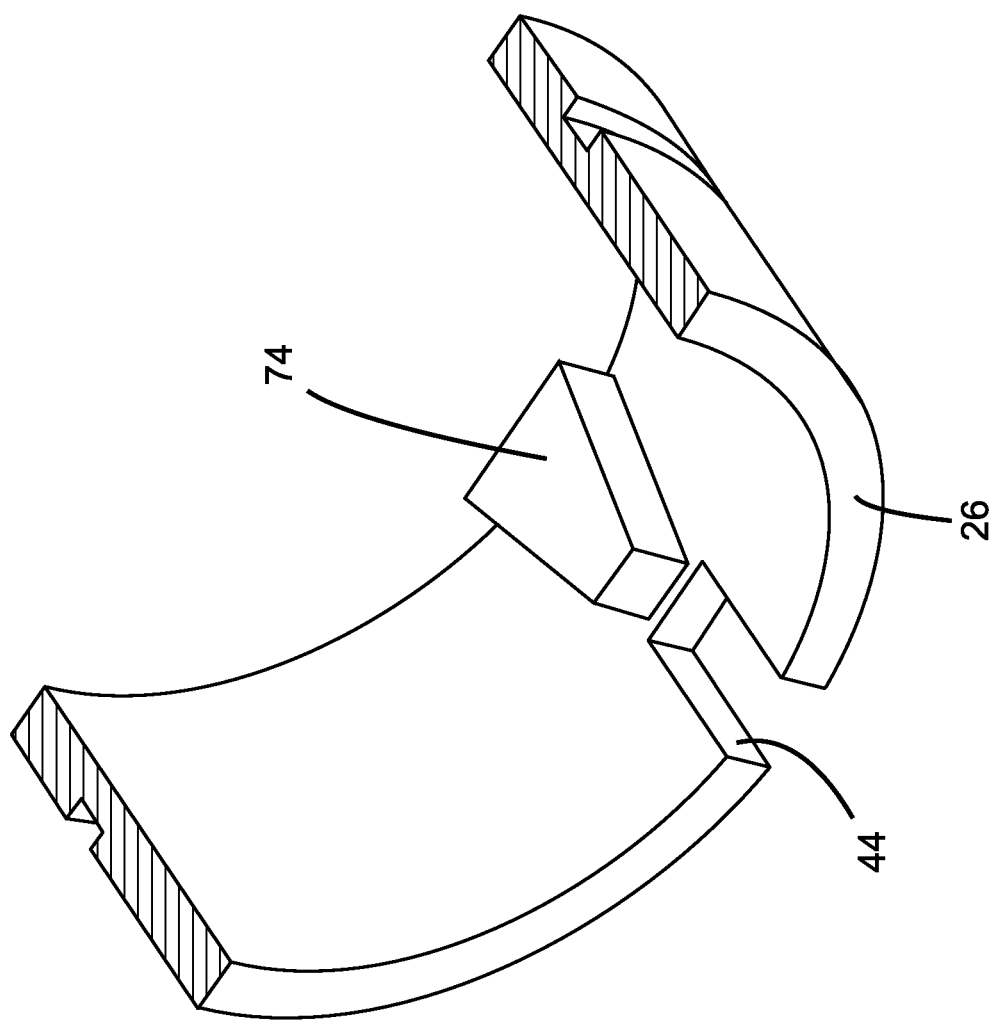
FIG. 4 is a partial cross-sectional view of a release sleeve of the socket of the fluid coupler of FIG. 1.
Figure 6:
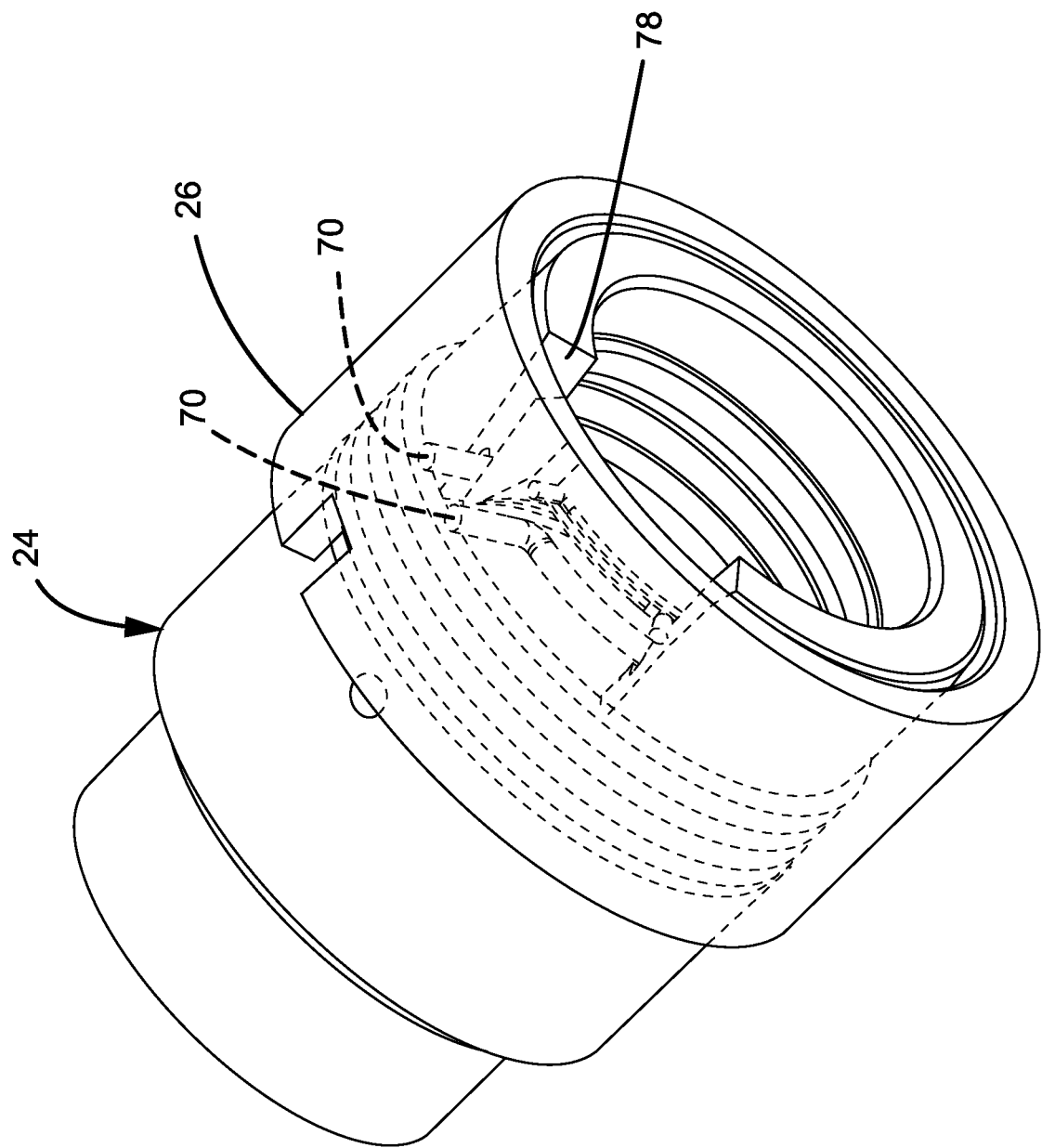
FIG. 6 is a perspective view of the socket of the fluid coupler of FIG. 1 with the release sleeve being transparent.
Figure 7:
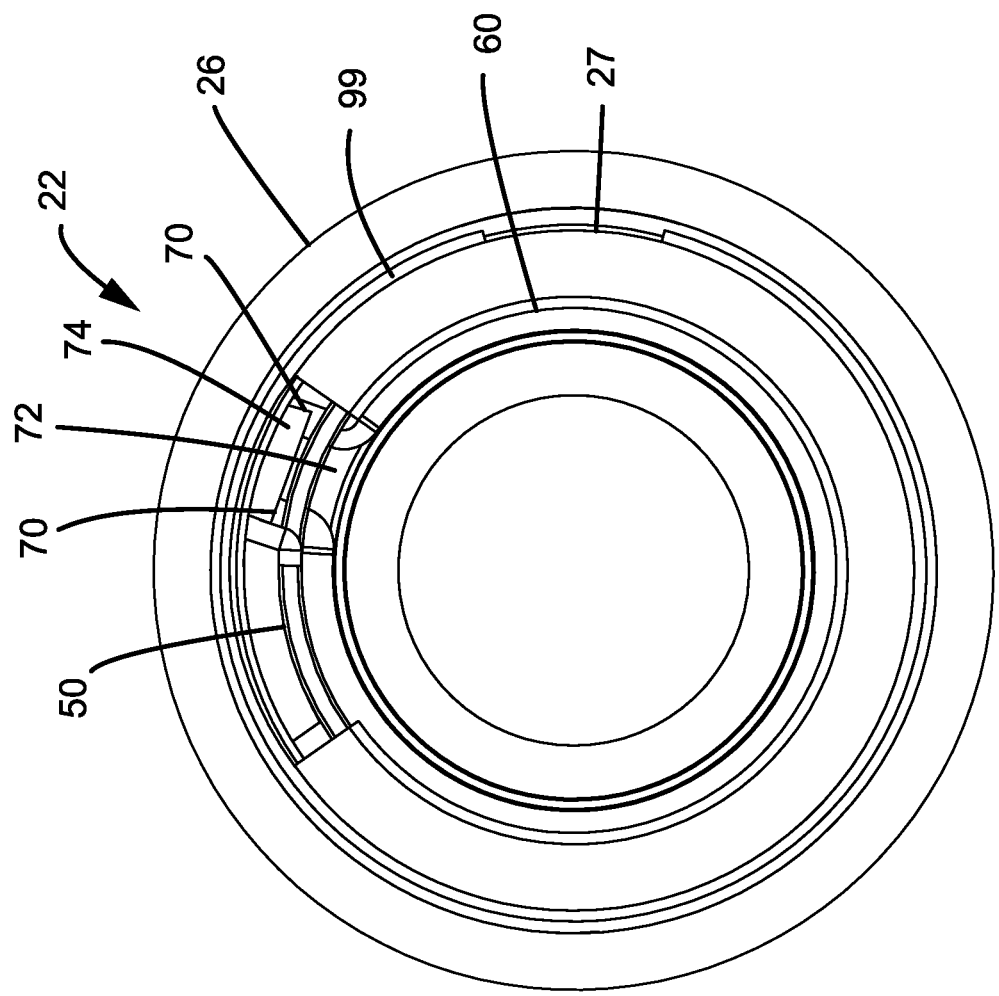
FIG. 7 is an end view of the socket of the fluid coupler of FIG. 1.

In one example, the snap ring 60 includes ends 70 defining a gap 72 (see FIGS. 6 and 7), and the release sleeve 26 includes a tapered projection 74 (see FIGS. 4 and 6) that fits within the gap 72 as the release sleeve 26 is moved axially toward the actuated position to expand the gap 72, thereby moving the snap ring 60 from the constricted state to the expanded state. In one example, the tapered projection 74 is a wedge. In one example, the main socket body 27 includes a socket wall 76 defining the socket receptacle 28, and the socket wall 76 defines an end notch 78 (see FIGS. 6 and 7) in which the gap 72 of the snap ring 60 and the tapered projection 74 are located. The exterior stop 31 fixed relative the socket body 27 axially aligns with the snap ring gap 72. The axial slot 44 of the release sleeve 26 axially aligns with the tapered projection 74 of the release sleeve. Thus, when the release sleeve 26 is moved to the second rotational position in which the stop 31 axially aligns with the slot 44, the tapered projection 74 also axially aligns with the snap ring gap 72 (e.g., see FIG. 8). By rotating the release sleeve 26 from the first rotational position to the second rotational position, the tapered projection 74 is brought into axial alignment with the gap 72. Then, by subsequently moving the release sleeve from the first axial position to the second axial position, the tapered projection 74 is forced into the gap 72 thereby expanding the gap 72 and moving the snap ring 60 to the expanded state in which the plug 22 can be removed from the socket 24.

In one example, the first spring 50 includes a first end including a first radial tang 90 that engages a wall surface 91 of the socket main body 27 defining the end notch 78 and a second end including a second radial tang 92 that engages a side surface 93 of the tapered projection 74 of the release sleeve 26 (see FIG. 5). Rotation of the release sleeve 26 from the first rotational position to the second rotational position causes torsional loading of the first spring 50, which rotationally biases the release sleeve 26 toward the first rotational position. An outer snap ring 99 can be used to retain the release sleeve 26 axially on the socket body 27 (see FIG. 8).

The various examples described above are provided by way of illustration only and should not be construed to limit the scope of the present disclosure. Those skilled in the art will readily recognize various modifications and changes that may be made without following the example examples and applications illustrated and described herein, and without departing from the true spirit and scope of the present disclosure.

What is claimed is:

1. A fluid coupler comprising:
   a socket including a socket body defining a receptacle for receiving a plug;
   a snap ring mounted within the receptacle for retaining the plug within the receptacle, the snap ring being moveable between a constricted state in which the snap ring is adapted to retain the plug within the receptacle and an expanded state in which the plug is removeable from the receptacle;
   a release sleeve mounted over the socket body, the release sleeve being moveable between a non-actuated position and an actuated position, the release sleeve being configured to move the snap ring from the constricted state to the expanded state when moved from the non-actuated position to the actuated position; and
   a first spring for rotationally biasing the release sleeve toward a first rotational position;
   wherein the snap ring includes ends defining a gap, and wherein the release sleeve includes a tapered projection that fits within the gap when the release sleeve is moved to the actuated position to cause the snap ring to move from the constricted state to the expanded state;
   wherein the socket defines a central axis along which the plug is inserted when the plug is inserted into the receptacle, and wherein the release sleeve moves axially along the central axis to move the tapered projection into the gap of the snap ring; and
   wherein the release sleeve is rotationally moveable relative to the socket body about the central axis of the socket between the first rotational position and a second rotational position, wherein the release sleeve is axially moveable relative to the socket body along the central axis between a first axial position and a second axial position, wherein the release sleeve is in the first axial position and the first rotational position when in the non-actuated position, and wherein the release sleeve is in the second rotational position and the second axial position when in the actuated position.

2. The fluid coupler of claim 1, wherein the release sleeve is concentrically mounted on the socket body.

3. The fluid coupler of claim 1, wherein the tapered projection is a wedge.

4. The fluid coupler of claim 1, further comprising a second spring for axially biasing the release sleeve toward the first axial position.

5. The fluid coupler of claim 4, wherein the second spring is a different type of spring from the first spring.

6. The fluid coupler of claim 5, wherein the first spring is a torsion spring and the second spring is a coil spring.

7. The fluid coupler of claim 1, further comprising a stop arrangement that prevents the release sleeve from being moved from the first axial position to the second axial position when the release sleeve is not in the second rotational position.

8. The fluid coupler of claim 1, wherein the tapered projection of the release sleeve axially aligns with the gap of the snap ring when the release sleeve is in the second rotational position.

9. The fluid coupler of claim 1, wherein the socket body defines an end notch in which the tapered projection and the gap of the snap ring are located.

10. The fluid coupler of claim 9, wherein the first spring includes ends including radial tangs located within the end notch, the radial tangs including a first radial tang that engages a wall surface of the socket body defining the end notch and a second radial tang engaging a side surface of tapered projection the release sleeve.

11. The fluid coupler of claim 1, wherein the snap ring is circular.

12. A method of coupling a plug to a socket comprising:
    coaxially aligning the plug with a receptacle of the socket;
    sliding a nose of the plug past an end of a release sleeve carried by the socket and into the receptacle of the socket while the release sleeve is disposed in a non-actuated position, wherein the release sleeve is moveable between the non-actuated position and an actuated position, wherein when the release sleeve is moved from the actuated position to the non-actuated position a snap ring is allowed to move to a constricted state via elasticity of the snap ring, and wherein when the release sleeve is moved to the actuated position the release sleeve forces the snap ring to move against the elasticity of the snap ring from the constricted state to an expanded state; and
    continuing to slide the plug into the receptacle of the socket until a snap-ring snaps over a stop surface at an exterior of the plug.

13. The method of claim 12, wherein the release sleeve remains in the non-actuated position during insertion of the plug into the socket.

14. The method of claim 12, wherein the plug is not rotationally aligned with the socket at any predetermined rotational orientation.

15. A method of decoupling a plug from a socket comprising:
    rotating a release sleeve relative to a main body of the socket from a first rotational position to a second rotational position in which a stop member carried by the socket aligns with a slot defined by the release sleeve;
    axially sliding the release sleeve relative to the main body of the socket in a first direction so that the stop member moves into the slot defined by the release sleeve;
    axially sliding the plug out of the socket and past the release sleeve in a second direction that is opposite the first direction; and
    wherein rotating the release sleeve relative to the main body of the socket comprises rotation the release sleeve against a bias of a first spring.

16. The method of claim 15, wherein axially sliding the release sleeve relative to the main body of the socket comprises axially sliding the release sleeve against a bias of a second spring.

17. A method of decoupling a plug from a socket comprising:
    rotating a release sleeve relative to a main body of the socket from a first rotational position to a second rotational position in which a stop member carried by the socket aligns with a slot defined by the release sleeve;
    axially sliding the release sleeve relative to the main body of the socket in a first direction so that the stop member moves into the slot defined by the release sleeve;
    axially sliding the plug out of the socket and past the release sleeve in a second direction that is opposite the first direction; and
    wherein axially sliding the release sleeve relative to the main body of the socket comprises axially sliding the release sleeve against a bias of a spring.

18. A fluid coupler comprising:
a socket including a socket body defining a receptacle for receiving a plug;
a snap clip mounted within the receptacle for retaining the plug within the receptacle, the snap clip being moveable between a constricted state in which the snap clip is adapted to retain the plug within the receptacle and an expanded state in which the plug is removeable from the receptacle; and
a release sleeve mounted over the socket body, the release sleeve being moveable between a non-actuated position and an actuated position, the release sleeve being configured to move the snap clip from the constricted state to the expanded state when moved from the non-actuated position to the actuated position;
wherein the snap clip includes ends defining a gap, and wherein the release sleeve includes a tapered projection that fits within the gap when the release sleeve is moved to the actuated position to cause the snap clip to move from the constricted state to the expanded state; and
wherein the socket defines a central axis along which the plug is inserted when the plug is inserted into the receptacle, and wherein the release sleeve moves axially along the central axis to move the tapered projection into the gap of the snap clip such that an axial movement of the tapered projection forces the ends of the snap clip apart to increase a size of the gap and thereby cause the snap clip to move from the constricted state to the expanded state.

19. The fluid coupler of claim 18, wherein the tapered projection is a wedge that is forced axially into the gap of the snap clip to force the snap clip to move from the constricted state to the expanded state.

20. The fluid coupler of claim 18, further comprising a spring for biasing the release sleeve toward the non-actuated position.

21. The fluid coupler of claim 18, wherein the snap clip is a snap ring.

22. The fluid coupler of claim 21, wherein the snap ring has a circular shape.

23. A fluid coupler comprising:
a socket including a socket body defining a receptacle for receiving a plug;
a snap clip mounted within the receptacle for retaining the plug within the receptacle, the snap clip being moveable between a constricted state in which the snap clip is adapted to retain the plug within the receptacle and an expanded state in which the plug is removeable from the receptacle;
a release sleeve mounted over the socket body, the release sleeve being moveable between a non-actuated position and an actuated position, the release sleeve being configured to move the snap clip from the constricted state to the expanded state when moved from the non-actuated position to the actuated position; and
a spring for biasing the release sleeve toward the non-actuated position.

24. The fluid coupler of claim 23, wherein the snap clip is a snap ring.

25. The fluid coupler of claim 24, wherein the snap ring has a circular shape.

* * * * *